No. 739,118. Patented September 15, 1903.

UNITED STATES PATENT OFFICE.

OTTO SOHST, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

MONOAZO DYE AND PROCESS OF MAKING SAME.

SPECIFICATION forming part of Letters Patent No. 739,118, dated September 15, 1903.

Application filed February 4, 1903. Serial No. 141,833. (Specimens.)

*To all whom it may concern:*

Be it known that I, OTTO SOHST, Ph. D., a citizen of the Empire of Germany, residing at Höchst-on-the-Main, Germany, have invented certain new and useful Improvements in the Manufacture of Monoazo Dyestuffs for Wool, of which the following is a specification.

Monoazo dyestuffs of pure greenish-blue shade have hitherto not been known.

I have found that the monoazo dyestuff obtained from para-diamidohydroquinonedialkyl ether (Nietzki & Rechberg, *Ber. d. d. Chem. Ges.* XXIII, 1211) and chromotropic acid of the constitution is

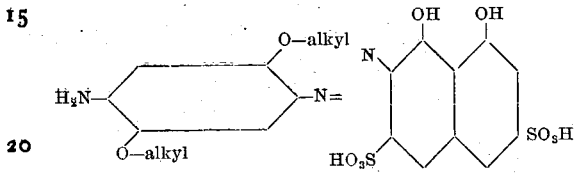

a technically valuable pure-blue dyestuff for wool. Its property of dyeing evenly is good, its fastness to alkali is equal to that of Victoria violet, and at least as good to water and washing.

The dyestuff is of special interest on account of its blue shade, of great importance in the dyeing and printing of wool. No pure greenish-blue dyestuff for wool easily discharged—that is to say, with tin salt—has hitherto been put at the disposal of the dyer or printer. Pure blue and, by adding yellow, green shades could only be obtained on wool in the discharge method of printing by using triphenylmethane dyestuffs, which can be discharged to produce white only with zinc-dust discharges. Their drawback, however, is that they considerably attack the wool fiber when steamed and the zinc-dust enters the grooves of the rollers.

This invention relates to the manufacture of azo dyestuffs, of which that defined above is an example, whereby there can be produced on wool blue and, by adding yellow azo dyestuffs, green shades, which exclusively consist of azo dyestuffs, and consequently are easily discharged with tin-salt discharges.

The manufacture is similar to that of the analogously-constituted Victoria violet (German Patent No. 70,885) and may be effected, for example, in one or other of the following manners: First, by diazotizing monoacetyl-para-diamidohydroquinonedialkyl ether, (obtained, for instance, by nitrating acetyl-amidohydroquinonedialkyl ether in a solution of glacial acetic acid and by reducing the nitro compound thus obtained,) then combining the diazo compound with chromotropic acid, and hydrolyzing the product; second, by diazotizing para-nitro-amidohydroquinonedialkyl ether (obtained, for instance, by hydrolysis of the above-mentioned nitro-acetylamido-hydroquinonedialkyl ether,) combining the diazo derivative with chromotropic acid, and reducing the product with sodium sulfid; third, by unsymmetrically diazotizing para-diamidohydroquinonedialkyl ether (as in the case of para-phenylenediamin, German Patent No. 42,011) and combining the product with chromotropic acid.

Example: 4.2 grams of acetyldiamidohy-droquinonedimethyl ether are diazotized in the usual manner, (as in the case of para-phenylenediamin.) The diazo solution is poured into a solution of ten grams of chromotropic acid of eighty-one per cent. strength and fifteen grams of sodium carbonate, whereupon ten cubic centimeters of caustic-soda lye are added, the whole being stirred for two hours. When the combination is complete, one hundred grams of concentrated caustic-soda lye are added and for the purpose of hydrolysis boiled for about half an hour. When cold, the separated dyestuff is filtered, pressed, and dried. It is a dark powder readily soluble in hot water with a green-blue color. With concentrated sulfuric acid a blue solution is obtained, which, on addition of water, becomes red violet.

Having now described my invention, what I claim is—

1. The process for the manufacture of a pure-blue monoazo dyestuff for wool, which consists in diazotizing monoacetyl-para-diamidohydroquinonedialkyl ether, in combining it in the usual manner with chromotropic acid and in eliminating the acetyl group according to known methods, substantially as set forth.

2. As a new product, the dyestuff obtained by the interaction of diazotized mono-acetylpara-diamidohydroquinonedialkyl ether and chromotropic acid, having the general formula:

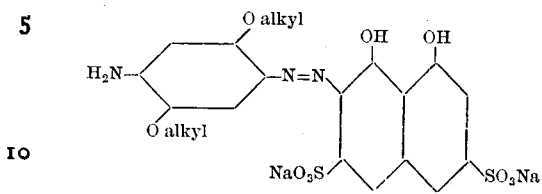

being a dark powder, easily soluble in hot water with a green-blue, in concentrated sulfuric acid with a blue color, which, on addition of water becomes red violet.

In testimony that I claim the foregoing as my invention I have signed my name in presence of two subscribing witnesses.

OTTO SOHST.

Witnesses:
 ALFRED BRISBOIS,
 BERNHARD LEYDECKER.